(12) United States Patent
Ohashi et al.

(10) Patent No.: US 6,774,323 B2
(45) Date of Patent: Aug. 10, 2004

(54) MULTI-FUNCTION ROTARY VEHICLE SWITCH MOUNTED TO A FIXED STALK

(75) Inventors: Hitoshi Ohashi, West Bloomfield, MI (US); Gerald O. Morrison, Beverly Hills, MI (US); Bruce Banter, Northville, MI (US); Brent A. Kuhn, Novi, MI (US)

(73) Assignee: Lear Corporation, Southfield, MI (US)

( * ) Notice: Subject to any disclaimer, the term of this patent is extended or adjusted under 35 U.S.C. 154(b) by 151 days.

(21) Appl. No.: 10/252,186

(22) Filed: Sep. 23, 2002

(65) Prior Publication Data

US 2004/0055856 A1 Mar. 25, 2004

(51) Int. Cl.[7] .............................. H01H 9/00; H01H 19/00
(52) U.S. Cl. ................. 200/61.54; 74/484 R; 180/333; 200/61.27
(58) Field of Search .................... 200/61.27–61.38, 200/61.54–61.57, 19.18; 307/9.1–10.8; 180/90, 333; 74/484 R

(56) References Cited

U.S. PATENT DOCUMENTS

| | | | | |
|---|---|---|---|---|
| 4,352,401 A | * | 10/1982 | Vitaloni | 200/61.27 X |
| 4,640,997 A | * | 2/1987 | Lane, Jr. | 200/64.54 |
| 5,107,243 A | * | 4/1992 | Maeda | 200/61.54 X |
| 5,430,265 A | * | 7/1995 | Beattie et al. | 200/61.54 |
| 5,581,058 A | * | 12/1996 | Javery et al. | 200/61.27 X |
| 5,905,237 A | * | 5/1999 | Hayakawa et al. | 200/61.28 |
| 6,020,563 A | * | 2/2000 | Risk et al. | 200/61.54 |
| 6,091,033 A | * | 7/2000 | Kato | 200/61.54 |
| 6,114,640 A | * | 9/2000 | Oddo et al. | 200/61.27 |
| 6,150,620 A | * | 11/2000 | Luley et al. | 200/61.27 |
| 6,234,269 B1 | * | 5/2001 | Salzer et al. | 180/333 |

* cited by examiner

Primary Examiner—James R. Scott
(74) Attorney, Agent, or Firm—Bill C. Panagos

(57) ABSTRACT

A switch assembly for a vehicle includes a stalk and a rotary switch. The stalk is fixed at one end to a steering column. The rotary switch is connected at one end to the other end of the stalk. The rotary switch is rotatable about a pivot axis normal to the other end of the stalk for switching between different rotary switch positions each associated with a respective vehicle control function. A rotatable knob may be connected to the other end of the rotary switch. The rotatable knob is rotatable about a rotational axis normal to the pivot axis of the rotary switch for switching between different rotatable knob positions each associated with a respective vehicle control function. The rotary switch may include control buttons each associated with a respective vehicle control function.

12 Claims, 3 Drawing Sheets

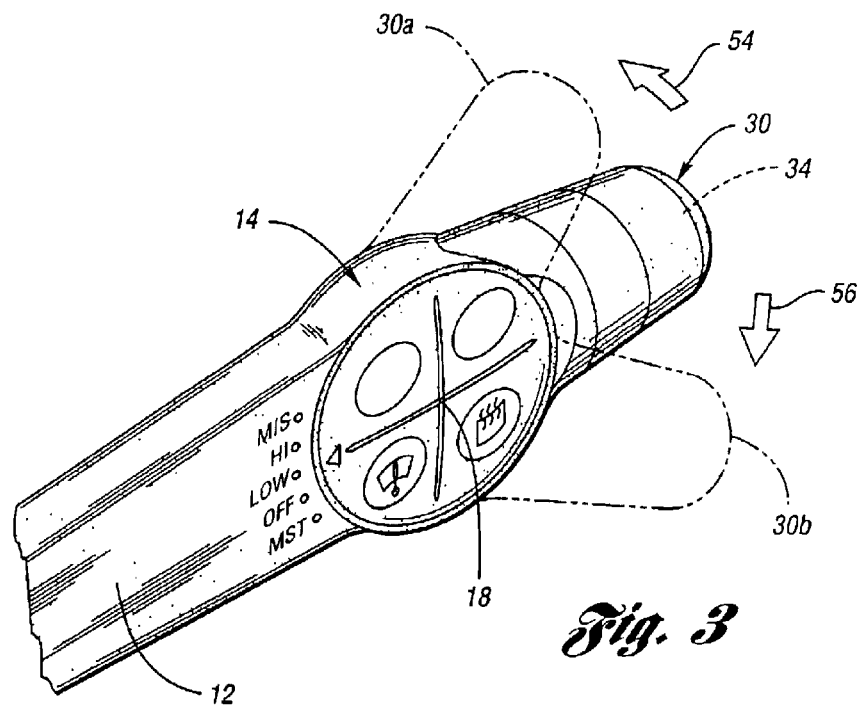
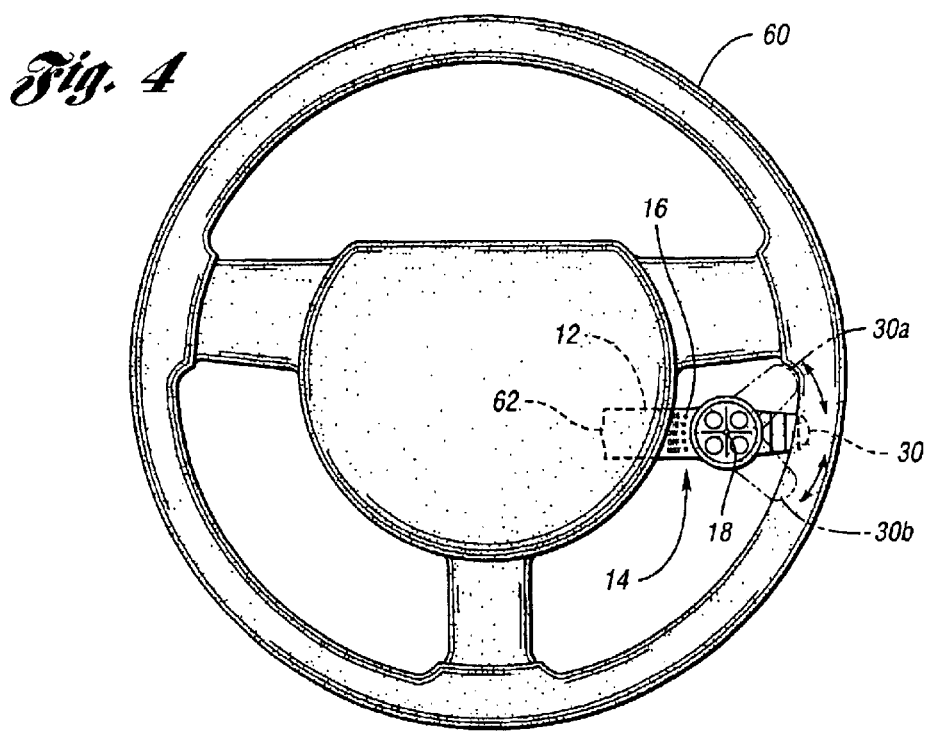

MULTI-FUNCTION ROTARY VEHICLE SWITCH MOUNTED TO A FIXED STALK

BACKGROUND OF THE INVENTION

1. Field of the Invention

The present invention relates to switches for regulating the operation of various devices in a vehicle.

2. Background Art

Typical vehicle switches include a stalk that pivots about a pivot point between different switch positions in response to operator actuation. Each switch position of the stalk is associated with a respective vehicle control function. For instance, a first switch position is associated with a right hand turn light control function while a second switch position is associated with a left hand turn light control function. The operator moves the stalk about the pivot point to move the stalk to the desired switch position. For example, the operator moves the stalk upward to the first switch position in order to turn on the right hand turn light. Similarly, the operator moves the stalk downward to the second switch position in order to turn on the left hand turn light.

A problem with vehicle switches that have such a movable stalk is that a portion of the stalk or the entire stalk may be hidden at some switch positions from the operator by the steering wheel or the like. Further, the switch position of the stalk may be difficult for the operator to determine as the switch position of the stalk is relative to the pivot point which typically is a connection point between the stalk and a steering column or the like. Consequently, the operator may have to compare the position of the stalk relative to the steering column in order to obtain a feeling for the switch position of the stalk.

SUMMARY OF THE INVENTION

Accordingly, it is an object of the present invention to provide a multi-function rotary switch mounted to a fixed stalk.

In carrying out the above object and other objects, the present invention provides a switch assembly for a vehicle. The switch assembly includes a stalk fixed at one end to a steering column. A rotary switch is connected at one end to the other end of the stalk. The rotary switch is rotatable about a pivot axis normal to the other end of the stalk for switching between different rotary switch positions. Each rotary switch position is associated with a respective vehicle control function.

A rotatable knob may be connected to the other end of the rotary switch. The rotatable knob is rotatable about a rotational axis normal to the pivot axis of the rotary switch for switching between different rotatable knob positions. Each rotatable knob position is associated with a respective vehicle control function.

The rotary switch may include control buttons each associated with a respective vehicle control function. For example, one of the control buttons is associated with a vehicle wiper control function, another one of the control buttons is associated with a vehicle defroster control function, a further one of the control buttons is associated with a vehicle lighting control function.

In one embodiment, the rotary switch is rotatable to switch between at least three rotary switch positions. In this embodiment, a first rotary switch position is associated with a vehicle turn light off control function, a second rotary switch position is associated with a vehicle right hand turn light on control function, and a third rotary switch position is associated with a vehicle left hand turn light on control function.

In another embodiment, the rotary switch is rotatable to switch between at least two rotary switch positions. In this embodiment, a first rotary switch position is associated with a vehicle wiper off control function, and a second rotary switch position is associated with a vehicle wiper on control function.

Further, in carrying out the above object and other objects, the present invention provides a second switch assembly for a vehicle. The second switch assembly includes a stalk having one end lying in a plane. The stalk is fixed in a given position. A rotary switch lying in the plane is connected at one end to the one end of the stalk. The rotary switch is rotatable relative to the one end of the stalk about a pivot axis normal to the plane for switching between different rotary switch positions lying in the plane. The rotary switch positions are associated with respective vehicle control functions.

The second switch assembly may further include a rotatable knob connected to the other end of the rotary switch. The rotatable knob is rotatable about a rotational axis lying in the plane and normal to the pivot axis of the rotary switch for switching between different rotatable knob positions lying out of the plane. The rotatable knob positions are associated with respective vehicle control functions.

The advantages accruing to the present invention are numerous. For instance, the rotary switch and fixed stalk configuration of the switch assembly effectively moves the pivot point from the connection point at the steering column, as done typically, to the connection point between the stalk and the rotary switch. As a result, an operator compares the position of the rotary switch relative to the end of the stalk that the rotary switch is connected to in order to determine the rotary switch position as opposed to comparing the position of the stalk relative to the steering column as is typically done. The position of the stalk relative to the steering column is typically visibly blocked by a steering wheel. As such, by moving the pivot point between the stalk and the rotary switch, the pivot point is moved away from the steering column to a location which is not visibly blocked by the steering wheel.

BRIEF DESCRIPTION OF THE DRAWINGS

FIG. 3 illustrates the rotation of the rotary switch of the switch assembly about a pivot axis;

FIG. 4 illustrates the placement of the switch assembly relative to a steering wheel;

DETAILED DESCRIPTION OF THE PREFERRED EMBODIMENT(S)

Figure 1:
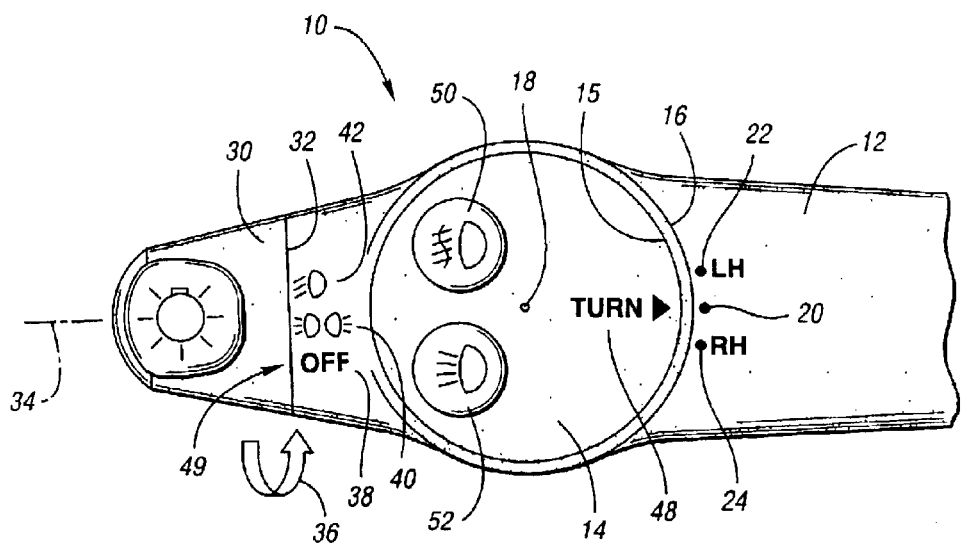
FIG. 1 illustrates a switch assembly having a rotary switch in accordance with a first embodiment of the present invention.
Figure 2:
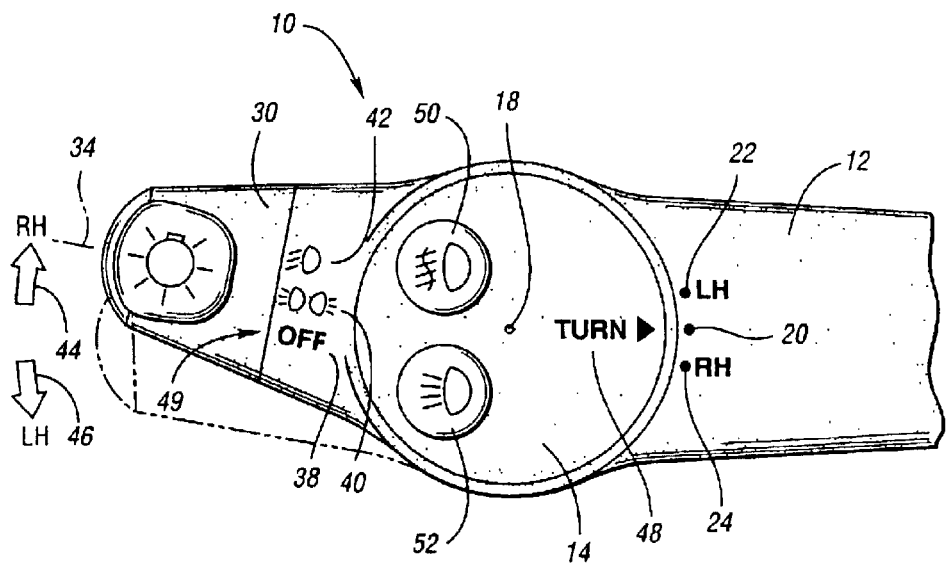
FIG. 2 illustrates the rotation of the rotary switch of the switch assembly from a first rotary position to a second rotary position.

Referring now to FIGS. 1 and 2, a switch assembly 10 in accordance with a first embodiment of the present invention is shown. Switch assembly 10 is generally for use in a vehicle and is to be operated by an operator to switch between different vehicle control functions. Switch assembly 10 controls vehicle functions which include turn lights, windshield wipers, defrosters, fog lamps, head lamps, and the like.

Switch assembly 10 generally includes a stalk 12 and a rotary switch 14. Stalk 12 is fixed in a given position and is fixedly connected at a first end to a steering column or the like (not shown in FIGS. 1 and 2). Rotary switch 14 is connected at one end 15 to a second end 16 of stalk 12. Rotary switch 14 includes a pivot axis or pivot point 18 which is generally normal or perpendicular to second end 16 of stalk 12. Pivot axis 18 is located in the center of rotary switch 14. Rotary switch 14 is rotatable about pivot axis 18 to move or rotate between different rotary switch positions 20, 22, and 24 relative to second end 16 of stalk 12.

Each rotary switch position 20, 22, and 24 is associated with a respective vehicle control function. Rotating rotary switch 14 to a rotary switch position 20, 22, and 24 switches or enables the respective vehicle control function associated with the rotary switch position. For instance, a first rotary switch position 20 is associated with a vehicle turn light off control function, a second rotary switch position 22 is associated with a vehicle left hand (LH) turn light on control function, and a third rotary switch position 24 is associated with a vehicle right hand (RH) turn light on control function. When rotary switch 14 is in first switch position 20, then the vehicle control systems control the turn lights to be off. When the operator rotates rotary switch 14 to second switch position 22 from first or third switch position 20 or 24, then the vehicle control systems control the left hand turn light to be on. Likewise, when the operator rotates rotary switch 14 to third switch position 24 from first or second switch positions 20 or 22, then the vehicle control systems control the right hand turn light to be on.

Second stalk end 16 includes indicia such as "LH" and "RH" associated with rotary switch positions 20, 22, and 24. Rotary switch 14 includes indicia 48 such as "Turn>" which points to the indicia of second stalk end 16 to enable the operator to visibly determine the position of the rotary switch relative to the second end of the stalk. Consequently, the operator can determine which vehicle control function is enabled in response to the rotary switch position of rotary switch 14.

Switch assembly 10 further includes a rotatable knob 30. Rotatable knob 30 is connected to the other end 32 of rotary switch 14. Rotatable knob 30 is rotatable or movable by the operator about a rotational axis 34 for switching between different knob positions 38, 40, and 42 in the direction of arrow 36. Rotational axis 34 is generally parallel to second end 16 of stalk 14 when rotary switch 14 is in its normal rotary switch position (as shown in FIG. 1). In general, rotational axis 34 is normal to pivot axis 18 of rotary switch 14 irrespective of the switch position of the rotary switch. Each knob position 38, 40, and 42 is associated with a respective vehicle control function.

Rotating rotatable knob 30 to a knob position 38, 40, and 42 enables the respective vehicle control function associated with the knob position. For example, a first knob position 38 is associated with a head lamp off control function, a second knob position 40 is associated with a parking or running light on control function, and a third knob position 42 is associated with a head lamp/parking light on control function. When rotatable knob 30 is in first knob position 38, then the vehicle control systems control the head lamps and the parking lights to be off. When the operator rotates rotatable knob 30 to second knob position 40, then the vehicle control systems control the parking lights to be on. Similarly, when the operator rotates rotatable knob 30 to third knob position, then the vehicle control systems control the parking lights and the head lamps to be on.

End 32 of rotary switch 14 and rotatable knob 30 include indicia to enable the operator to determine the position of the rotatable knob relative to the other end of the rotary switch. For instance, rotatable knob 30 includes indicia 49 such as ">". Consequently, the operator can determine which vehicle control function is enabled in response to the knob position of rotatable knob 30.

FIG. 1 illustrates rotary switch 14 in first switch position 20 for turning off the turn lights. First switch position 20 is the normal switch position of rotary switch 14. FIG. 2 illustrates rotary switch 14 in third rotary switch position 24 for enabling the right hand turn light to be on. As such, third rotary switch position 24 is the right turning light position of rotary switch 14. As can be seen from comparing FIGS. 1 and 2, rotary switch 14 pivots or rotates about pivot point 18 relative to second end 16 of stalk 14 in the clockwise direction indicated by arrow 44 to rotate from first switch position 20 to third switch position 24. Further, as can be seen from comparing FIGS. 1 and 2, indicia 48 of rotary switch 14 moves from pointing towards the second stalk end indicia associated with first switch position 20 to pointing towards the second stalk end indicia associated with third switch position 24.

As rotatable knob 30 is connected to rotary switch 14, the rotatable knob also moves in the clockwise direction indicated by arrow 44 as the rotary switch pivots about pivot point 18. The dotted line 26 in FIG. 2 illustrates the outline of rotary switch 14 and rotatable knob 30 when the rotary switch is in the normal switch position, i.e., first switch position 20, shown in FIG. 1.

Similarly, rotary switch 14 pivots about pivot point 18 relative to second stalk end 16 in the counterclockwise direction indicated by arrow 46 to rotate from either of first or third switch positions 20, 24 to second switch position 22. Rotatable knob 30, which is connected to rotary switch 14, also moves in the counterclockwise direction indicated by arrow 46 as the rotary switch pivots about pivot point 18 to second switch position 22.

Rotary switch 14 further includes control buttons 50 and 52. Control buttons are associated with respective vehicle control functions. An operator may press or actuate either of control buttons 50 and 52 to enable the respective vehicle control function. For instance, control buttons 50 and 52 are respectively associated with fog lamps and head lamp high beams control functions. Actuating either control button 50 or 52 enables the associated fog lamps and head lamp high beams.

Referring now to FIG. 3, the rotational adjustment of rotary switch 14 about pivot axis 18 is shown in more detail. Dotted outline 30a indicates the position of rotary switch 14 and rotatable knob 30 after the rotary switch has been rotated about pivot axis 18 in a counterclockwise direction indicated by arrow 54. Dotted outline 30b indicates the position of rotary switch 14 and rotatable knob 30 after the rotary switch has been rotated about pivot axis 18 in a clockwise direction indicated by arrow 56.

Referring now to FIG. 4, the placement of switch assembly 10 relative to a steering wheel 60 is shown. Switch assembly 10 is placed behind steering wheel 60 with stalk 12 fixed at a first end 62 to the steering column of the steering wheel. As such, first end 62 of stalk 12 is visibly blocked by steering wheel 60. However, switch assembly 10 is positioned such that rotary switch 14 and second stalk end 16 (as well as rotational knob 30) is not visibly blocked by steering wheel 60 as shown in FIG. 4. Accordingly, the rotational position of rotary switch 14 relative to second stalk end 16 is visible to the operator at all times. Further, the operator can view the indicia of second stalk end 16 and rotary switch 14 to determine the rotary switch position of the rotary switch.

With reference to FIGS. 1, 2, 3, and 4, second stalk end 16 essentially lies in a plane and the stalk is fixed in a given position. Rotary switch 14 lies in the same plane and is connected at end 15 to second stalk end 16. Rotary switch 14 is rotatable relative to the second stalk end 16 about pivot axis 18. Pivot axis 18 is normal to the plane in which second stalk end 16 and rotary switch 14 lie. Rotary switch 14 is rotatable for switching between the different rotary switch positions 20, 22, and 24 which also lie in the same plane.

Rotatable knob 30 is connected to end 32 of rotary switch 14. Rotatable knob 30 is rotatable about rotational axis 34. Rotational axis 34 lies in the plane and is normal to pivot axis 18 of rotary switch 14 for switching between different rotatable knob positions lying in and out of the plane. Rotatable knob 30 is rotatable in and out of the plane for switching between the different rotatable knob positions 38, 40, and 42.

Figure 5:
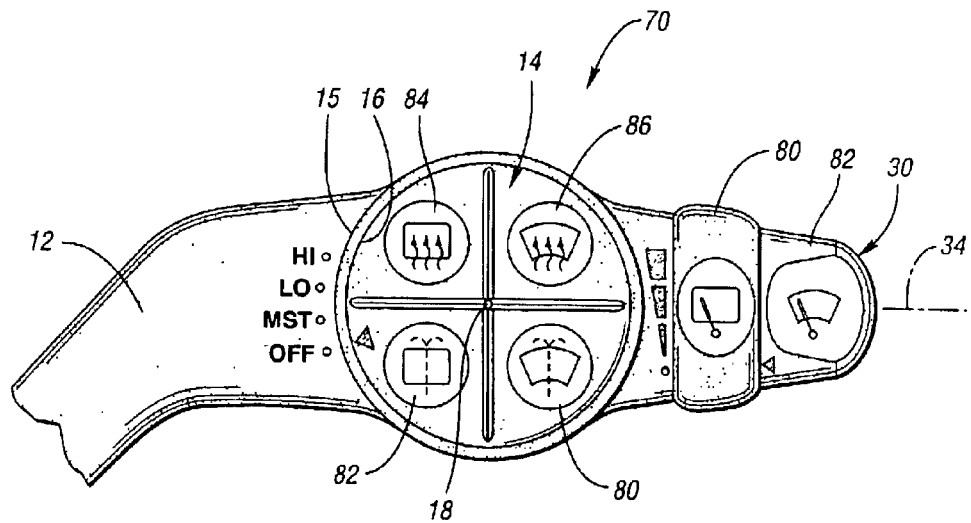
FIG. 5 illustrates a switch assembly having a rotary switch in accordance with a second embodiment of the present invention.
Figure 6:
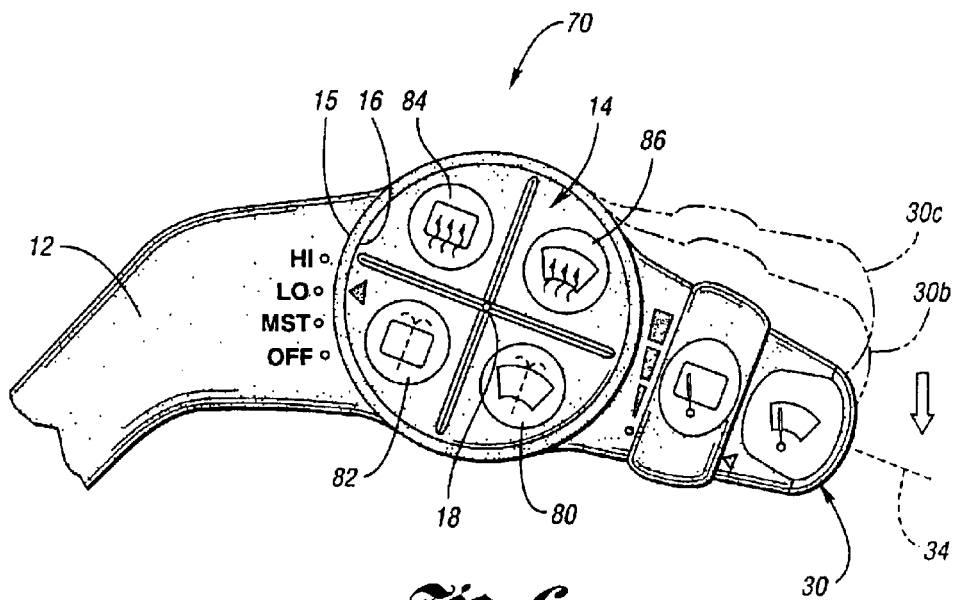
FIG. 6 illustrates the rotation of the rotary switch of the switch assembly shown in FIG. 5 between rotary switch positions.

Referring now to FIGS. 5 and 6, a switch assembly 70 in accordance with a second embodiment of the present invention is shown. Switch assembly 70 is generally similar to switch assembly 10 and like elements are identified with the same reference numerals.

Rotary switch 14 rotates about pivot axis 18 to different rotary switch positions for controlling the speed of the front windshield wipers. For instance, a first rotary switch position is associated with a front windshield wiper off control function, and a second rotary switch position is associated with a front windshield wiper on control function. Such a front windshield wiper on control function may include different speeds of front windshield wiper operation.

Rotatable knob 30 includes a pair of rotatable knobs which rotate about rotational axis 34. Rotatable knob 80 rotates about rotational axis 34 to different knob positions each associated with rear windshield wiper speed control. Rotatable knob 82 rotates about rotational axis 34 to different knob positions each associated with front windshield wiper speed control.

FIG. 5 illustrates rotary switch 14 in a rotary switch position for turning off the windshield wipers. FIG. 6 illustrates rotary switch 14 in a rotary switch position for turning on the windshield wipers to a low speed. As can be seen from comparing FIGS. 5 and 6, rotary switch 14 pivots or rotates about pivot point 18 relative to second stalk end 16 in the clockwise direction indicated by arrow 74 to rotate from the "OFF" rotary switch position to the "LO" rotary switch position. As rotatable knob 30 is connected to rotary switch 14, the rotatable knob also moves in the clockwise direction indicated by arrow 74 as the rotary switch pivots about pivot point 18. Dotted line 30c in FIG. 6 illustrates the outline of rotary switch 14 and rotatable knob 30 when the rotary switch is in the "OFF" rotary switch position shown in FIG. 5. Dotted line 30d in FIG. 6 illustrates the outline of rotary switch 14 and rotatable knob 30 when the rotary switch is in the "MST" rotary switch position.

Rotary switch 14 further includes control buttons 80, 82, 84, and 86. Control buttons 80, 82, 84, and 86 are associated with windshield washer and defroster control functions. For instance, control buttons 80 and 82 are respectively associated with front and rear windshield washer functions. Control buttons 84 and 86 are respectively associated with rear and front defroster functions. Pressing either of control button 80, 82, 84, or 86 enables the control function.

While embodiments of the present invention have been illustrated and described, it is not intended that these embodiments illustrate and describe all possible forms of the invention. Rather, the words used in the specification are words of description rather than limitation, and it is understood that various changes may be made without departing from the spirit and scope of the present invention.

What is claimed is:

1. A switch assembly for a vehicle, the assembly comprising:

a stalk fixed at one end to a steering column; and a rotary switch connected at one end to the other end of the stalk, the rotary switch being rotatable about a pivot axis normal to the other end of the stalk for switching between different rotary switch positions each associated with a respective vehicle control function.

2. The assembly of claim 1 further comprising:

a rotatable knob connected to the other end of the rotary switch, the rotatable knob being rotatable about a rotational axis normal to the pivot axis of the rotary switch for switching between different rotatable knob positions each associated with a respective vehicle control function.

3. The assembly of claim 1 wherein:

the rotary switch includes control buttons each associated with a respective vehicle control function.

4. The assembly of claim 3 wherein:

one of the control buttons is associated with a vehicle wiper control function.

5. The assembly of claim 3 wherein:

one of the control buttons is associated with a vehicle defroster control function.

6. The assembly of claim 3 wherein:

one of the control buttons is associated with a vehicle lighting control function.

7. The assembly of claim 1 wherein:

the rotary switch is rotatable to switch between at least three rotary switch positions, wherein a first rotary switch position is associated with a vehicle turn light off control function, a second rotary switch position is associated with a vehicle right turn light on control function, and a third rotary switch position is associated with a vehicle left turn light on control function.

8. The assembly of claim 1 wherein:

the rotary switch is rotatable to switch between at least two rotary switch positions, wherein a first rotary switch position is associated with a vehicle wiper off control function, and a second rotary switch position is associated with a vehicle wiper on control function.

9. A vehicle comprising:

a steering column; and a switch assembly having a stalk fixed at one end to the steering column, the switch assembly further having a rotary switch connected at one end to the other end of the stalk, the rotary switch being rotatable about a pivot axis normal to the other end of the stalk for switching between different rotary switch positions each associated with a respective vehicle control function.

10. The assembly of claim 9 further comprising:

a rotatable knob connected to the other end of the rotary switch, the rotatable knob being rotatable about a rotational axis normal to the pivot axis of the rotary switch for switching between different rotatable knob positions each associated with a respective vehicle control function.

11. A switch assembly for a vehicle, the assembly comprising:

a stalk having one end lying in a plane, the stalk being fixed in a given position; and a rotary switch lying in the plane and connected at one end to the one end of the stalk, the rotary switch being rotatable relative to the one end of the stalk about a pivot axis normal to the plane for switching between different rotary switch positions lying in the plane, the rotary switch positions being associated with respective vehicle control functions.

12. The assembly of claim 11 further comprising:

a rotatable knob connected to the other end of the rotary switch, the rotatable knob being rotatable about a rotational axis lying in the plane and normal to the pivot axis of the rotary switch for switching between different rotatable knob positions lying out of the plane, the rotatable knob positions being associated with respective vehicle control functions.

* * * * *